United States Patent [19]

Feller et al.

[11] Patent Number: 5,736,054
[45] Date of Patent: Apr. 7, 1998

[54] METHOD OF DETERMINING VALUES OF OPERATING PARAMETERS OF A CENTRIFUGE

[75] Inventors: Johann Feller, Tuntenhausen; Bruno Hegnauer, Gauting, both of Germany

[73] Assignee: Krauss Maffei Aktiengesellschaft, Munich, Germany

[21] Appl. No.: 381,755

[22] Filed: Feb. 1, 1995

[51] Int. Cl.$^6$ ............................................. B04B 13/00
[52] U.S. Cl. .................. 210/739; 210/746; 210/787; 73/650; 494/10; 494/37
[58] Field of Search ............................ 210/739, 746, 210/787, 144; 73/649, 650; 364/801; 494/10, 37

[56] References Cited

U.S. PATENT DOCUMENTS

| | | |
|---|---|---|
| 4,267,734 | 5/1981 | Shima et al. . |
| 4,522,620 | 6/1985 | Leister ........................ 210/144 |
| 4,900,453 | 2/1990 | Sedimayer .................. 210/742 |

FOREIGN PATENT DOCUMENTS

| | | |
|---|---|---|
| 0 456 861 | 11/1991 | European Pat. Off. . |
| 0 724 912 | 2/1995 | European Pat. Off. . |
| 1 532 676 | 2/1970 | Germany . |
| 1 951 574 | 4/1970 | Germany . |
| 27 09 569 | 10/1977 | Germany . |
| 32 41 624 | 5/1984 | Germany . |
| 33 31 966 | 3/1985 | Germany . |
| 37 26 227 | 2/1989 | Germany . |
| 39 25 198 | 3/1990 | Germany . |
| 40 04 584 | 8/1991 | Germany . |
| 40 41 923 | 7/1992 | Germany . |
| 42 27 291 | 2/1995 | Germany . |
| 43 34 939 | 4/1995 | Germany . |
| 1 765 708 | 9/1992 | Russian Federation . |
| 1 507 742 | 4/1978 | United Kingdom . |
| 2 130 371 | 5/1984 | United Kingdom . |
| 2 146 130 | 4/1985 | United Kingdom . |

OTHER PUBLICATIONS

Bruno Hegnauer; Der Thermofullkontrollregler, Chem.-Ing.-Tech.62 1990)Nr.4,S.304–306.

*Primary Examiner*—David A. Reifsnyder
*Attorney, Agent, or Firm*—Herbert Dubno

[57] ABSTRACT

An operating parameter of a centrifuge is determined by converting vibration of the machine frame of the centrifuge on rotation of the drum thereof to electrical signals having a frequency spectrum which is analyzed. Variations of the peak amplitudes and frequency locations on frequency analysis, e.g. by Fast Fourier Transmissions, is used to signal the parameter, e.g. a parameter representing the degrees of filling the centrifuge, termination of filtration, etc.

4 Claims, 3 Drawing Sheets

5,736,054

METHOD OF DETERMINING VALUES OF OPERATING PARAMETERS OF A CENTRIFUGE

FIELD OF THE INVENTION

The present invention relates to a method of determining values representative of operating parameters of a centrifuge, for example, the degree of filling. The invention also relates to an apparatus for this purpose, particularly involving a centrifuge having a centrifuge drum rotatable in a machine frame and provided with at least one sensor.

BACKGROUND OF THE INVENTION

German Patent Document DE 37 26 227 C2 discloses a method of and an apparatus for determining an operating parameter of a centrifuge utilizing a feeler arm in the interior of the centrifuge drum which rides with its tip on the surface of the suspension in the centrifuge drum.

Filter centrifuges generally comprise a drum into which the suspension is fed and which is rotated so that the liquid phase of the suspension passes through the filter surfaces, i.e. a perforated wall of the drum, to leave a filter cake on the wall of the drum consisting of the solids of the original suspension.

The filter drum is journalled on the machine housing or frame and is rotated by an electric motor at the speed necessary to force the liquid through the filter cake or otherwise out of the drum.

In a system of the type described, the feeler arm is mounted on a shaft which extends out of the drum and is provided with a signal generator producing electrical signals which represent the angular displacement of the shaft or the angular position thereof. The degree of filling of the mixture in the centrifuge drum can thus be detected as a function of the angular displacement and hence the outputted signal. The sensor tip can be provided with a thermosensor which can be responsive to the temperature of the surface of the mixture to be detected.

With the method and device of the aforementioned system, it is a drawback that the sensing elements must be provided in the process space of the centrifuge. Furthermore, when the sensor detects the level of the liquid in the centrifuge, it provides no indication of the amount of solids below the liquid. The method is therefore usable only with filter centrifuges and in some cases with discontinuous sedimentation centrifuges. With centrifuges which operate with continuous castoff of the liquid over a lip of the centrifuge drum and other types of centrifuges separating solids from liquids, this earlier system for determining filling parameters of the centrifuge is less useful or are not useful at all.

A similar method and apparatus is also described in the publication "Der Thermofullkontrollregler", in: Chemie-Ing-Technik 62 (1990), pages 304–306.

Centrifuges have also been provided with filling controls which provide a skid capable of riding on the body of liquid in the centrifuge, particularly for discontinuously operating filter centrifuges by contact with the liquid rotating at the speed of the drum, the movement of the skid into the drum may be stopped by the rotating liquid ring and via appropriate sensors, the position of the moving parts of the skid at the skid mounting or drive can provide an indication of the degree of filling of the centrifuge.

In the centrifuge field, it is also known to provide radiometric filling monitors which operate by measuring the absorption or radioactive rays or, in general, radiation. absorption of radioactivity is dependent upon the mass in the radiation field and thus the calculations must take into consideration the densities of the media involved in establishing the filling height. Since during the filtration process, the proportion of solid to liquid continuously changes, no absolute indication of the degree of filling is possible where the proportions of the solid and liquid medium are not known or the mixture contains phases which themselves are of different densities.

Apparatuses for radiometric monitoring of the degree of filling of the centrifuge do have the advantage that they can be provided outside the process space of the centrifuge although the cost of such apparatus makes its use prohibitive in many instances.

It is also known to use ultrasonic devices for monitoring the degree of filling a centrifuge.

An ultrasonic sensor within the centrifuge directs a measurement beam against the surface of the mixture within the drum and measures the distance to the surface of the mixture from which the degree of filling can be determined.

This system also has drawbacks in that the ultrasonic sensor can be subjected to corrosion within the centrifuge drum and may require expensive maintenance procedures. In systems which are sensitive to explosion, ultrasonic sensors are problematical because of the comparatively large volume which is occupied by such sensors and which must be sealed. Furthermore, the measuring beam generally has a limited energy density and, with ultrasonic sensors operating at a comparatively low frequency range with high speeds between the measured head and the medium to be measured, can be deflected so that the results may become unreliable.

A further possibility of measuring the degree of filling of a centrifuge is to couple the centrifuge with a load cell or a weight responsive measuring system. This indeed can provide an indication as to how much product is found in the centrifuge drum. It is an advantage with this system that the load cells can be located outside the process space, i.e. externally of the drum. However, the use of such a system for measuring the degree of filling is problematical because the ratio between the maximum amount of material which can fill the centrifuge and the weight of the centrifuge itself is about 1:50 to 1:100. Hence the difference in weight between an empty state and a completely filled state is not significant and often cannot be detected with great precision. It is also not possible to detect differences resulting from the presence of the filter cake or the medium to be filtered with any great accuracy. Furthermore, in the case of a nonuniform distribution of the product in the centrifuge and thus an unbalanced operation of the drum, the vibrations transmitted to the load cell may further render the results unreliable.

German Patent Document DE 40 41 923 A1 discloses a process for determining torque differences between the drum and worm in a decanter type of centrifuge. In this process the measurement of the torque can give the degree of filling in the discharge region of the decanter. An indication of the liquid content within the sedimentation part of the decanter, however, cannot be obtained in this manner.

A process of the type described in this patent document also allows control of the decanter only in the operating range close to 100% of filling of the discharge region of the worm with product as is customary, for example, with clarifier sludge separation. A control of the operation of a decanter in ranges substantially lower cannot be effected by this process.

With continuously operating centrifuges (decanters), it is important that the proportion of the liquid in the centrifuge be known with precision to operate at optimum power and optimum degree of separation.

It is thus required not only to know the degree of filling of the solids in the discharge region but also the proportion of solid to liquid in the entire decanter. In discontinuously operating centrifuges, the steps of filling with the solid/liquid mixture, the washing (expression of undesired primary liquid) and the extractive drying of the filter cake are carried out one after the other so that the transitions are effected at optimum points. It is desirable to know the degree of filling of the drum with solids as well as the degree of filling with any liquid phase. It is also important to be able to ascertain the point in time at which the suspension liquid penetrates into the filter cake. In dependence upon the degree of filling and the liquid penetration point, the sequence of steps is controlled and the duration of the steps can be matched to the requirements of the products to be filtered.

It is then possible to discharge the separated solids only when the requisite product quality (residual mixture) has been reached. Of course, the discharge of the centrifuge should not be delayed until the desired product quality point has been exceeded if valuable production time and hence output capacity is not to be lost.

OBJECTS OF THE INVENTION

It is therefore, the principal object of the invention to provide a process for determining an operating parameter of a centrifuge which minimizes service and maintains costs, provides the operating parameter reliability and with precision, and which can be used for practically any type of centrifuge.

Another object of this invention is to provide an improved apparatus for determining a value for an operating parameter of a centrifuge which is especially suited for the method of the invention and has low maintenance requirements.

It is another object of this invention to provide an improved method of operating a centrifuge whereby drawbacks of earlier methods are avoided.

SUMMARY OF THE INVENTION

These objects and others which will become apparent hereinafter are attained, in accordance with the invention by providing the centrifuge with at least one sensor for vibration or oscillation frequencies and intensities of the centrifuge and producing electrical signals representing the vibration or oscillation frequencies and intensities. These signals are subjected to a frequency spectrum analysis and from the determined frequency spectrum individual harmonic vibrations or oscillations are isolated and thereafter from a respective harmonic oscillator a characteristic intensity for a time interval providing a value of an operating parameter is obtained.

More particularly, a method of determining an operating parameter of a centrifuge can comprise the steps of:
(a) supplying a centrifuge with a suspension of solids in a liquid, and driving the centrifuge to discharge liquid of the suspension and collect the solids;
(b) detecting vibration of the centrifuge and producing electrical signals of a frequency and amplitude representing the vibration and having a frequency spectrum characteristic of operation of the centrifuge, presence and absence of the spectrum, and characteristics of the liquid and solids in the centrifuge;
(c) subjecting the electrical signals to a frequency spectrum analysis and isolating from the frequency spectrum by the analysis selected harmonic oscillations; and
(d) determining the parameter by evaluating a change in amplitude of the selected harmonic oscillations over a time interval.

With the process of the invention, only a single vibration pickup is required and it can, of course, be located outside the centrifuge drum as long as it is positioned on a portion of the centrifuge which is subject to vibration upon operation of the centrifuge. Utilizing the single pickup, a multiplicity of operating parameters can be ascertained as will be developed below. Among these parameters and, perhaps, one of the most important, is the degree of filling of the centrifuge drum with the suspension.

From the frequency spectrum, moreover, I can ascertain the ratio of liquid to solid, the proportion of the liquid phase in the centrifuge, the peripheral speed of the liquid ring and the ratio of this speed to the speed of the centrifuge drum, the reduction in mass with dry centrifugal discharge of the solids or the degree of filling in the decanter. The liquid penetration point can also be ascertained. These are among the operating parameters which can be detected with the system of the invention.

To obtain a value of one of the parameters set out above with the process of the invention, I may monitor the isolated harmonic oscillation of two successive frequency spectra and determine the particular value of interest from the difference in amplitudes thereof. The values obtained can thus be obtained in an extremely short period of time, can be independent of the speed of the drum, of the particular product which is handled and from the temperature. Apart from determining the operating parameters of a centrifugal filtration, the values of other machine parameters can be obtained, including, for example, the state of the main shaft bearings or the wear or status of other machine components. The system of the invention thus allows monitoring of the various components of the apparatus.

By means of the frequency spectrum analysis, the vibration frequency and vibration intensities are obtained for particular products and by operation of the centrifuge without filling, can be compared with vibration frequencies and vibration intensities intrinsic to the machine without the product. A computer or other evaluating circuitry can be provided to output either the machine monitoring results or the product specific operating parameters of the centrifuge during the centrifugation.

According to the invention, the characteristic frequency of a loaded centrifuge drum preparatory to operation, a so-called rotor characteristic frequency can be obtained. In this manner, the change in mass of the filled centrifuge drum gives rise to a shift in the rotor characteristic frequency which can be detected by the pickup. Such a shift can occur upon filling of the centrifuge drum with the mixture to be separated as well as during the centrifugal separation. As a consequence, a desired degree of filling can correspond to a specific characteristic frequency which is thus a measure of the desired degree of filling. Since the centrifugation shifts the characteristic frequencies of the rotor, i.e. the centrifuge drum filled with the suspension and its shaft, as a result of the progressive discharge of the liquid during the separation, when a desired degree of filtration is the parameter to be determined, a characteristic frequency can constitute a measurement of attainment of the degree of filtration. Furthermore, by detecting the change in damping of the rotor characteristic frequency, I may obtain an indication in the change in the proportion of the liquid relative to the filter cake in the drum since the damping, quantity for quantity, is greater for the filter cake for the liquid phase. According to a feature of the invention, the sensor applied to the centrifuge is a vibration pickup outputting the electrical signal representing a frequency spectrum and the output of the sensor is connected to a signal input of an apparatus for carrying out frequency spectrum analysis. It has been found to be especially advantageous to provide the sensor on the machine frame. This insures a high degree of accessibility for the sensor and insures that the sensor need not come into contact with the product in the centrifuge drum. Maintenance is simplified, wear is reduced to practically nil and possible corrosion is avoided.

Furthermore, by providing the sensor outside the centrifuge drum on the machine drum, complex electrical conductor systems connecting the sensor to the circuitry need not be provided within the drum. The provision of the sensor externally of the drum also eliminates any dead space within the drum would otherwise have to be occupied by the sensor.

According to a feature of the invention, the spectrum analysis is effected by Fast Fourier Transformation (FFT). The intensity at a respective frequency window of a spectrum is compared, according to the invention, with the intensity or amplitude of a predetemined frequency value in the analysis. In practically all cases, significant information as to the parameter involve can be obtained by monitoring the change with time of a characteristic frequency or character frequency window within the spectrum as to amplitude or intensity.

The vibration pickup can be an acceleration sensor, i.e. an accelerometer, and the computer or frequency spectrum analyzer can be connected to a display device for displaying the parameter or the spectrum or both.

BRIEF DESCRIPTION OF THE DRAWING

The above and other objects, features and advantages will become more readily apparent from the following description, reference being made to the accompanying drawing in which.

SPECIFIC DESCRIPTION

Figure 1:
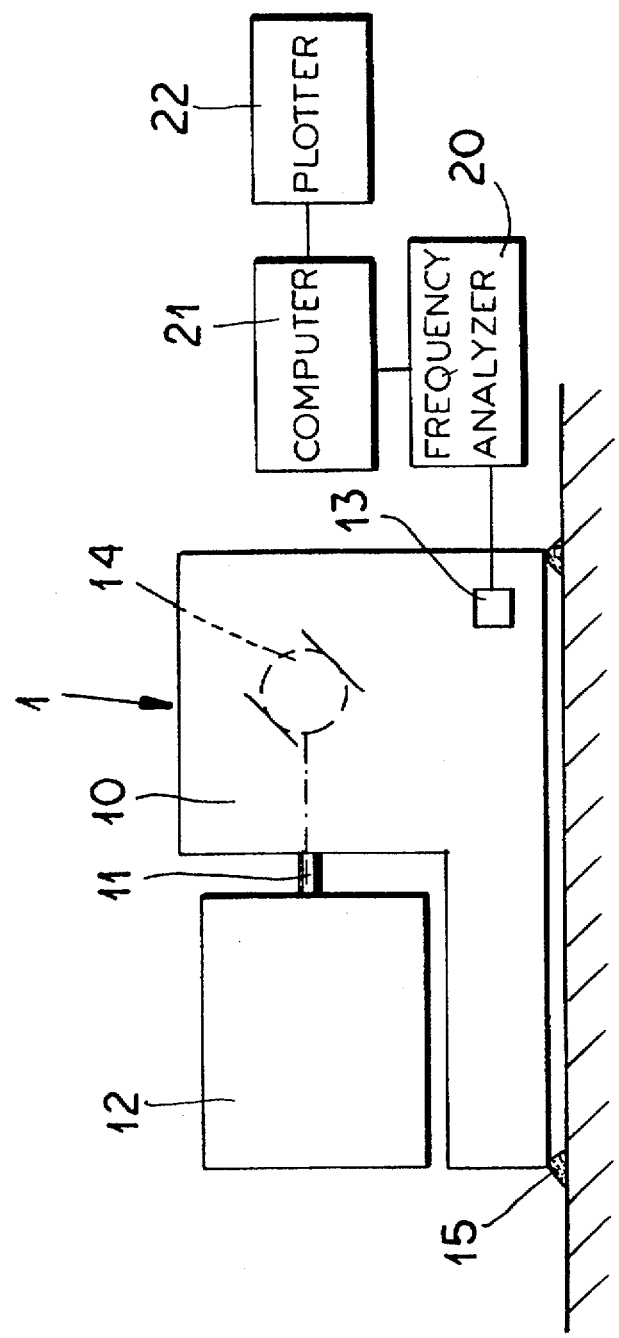
FIG. 1 is a schematic illustration of an apparatus in the form of a filter centrifuge in accordance with the present invention.

FIG. 1 is a schematic illustration of a centrifuge 1 for a machine frame 10 and a centrifuge drum driven via the drive shaft 11 by an electric motor schematically represented at 14. The machine may be supported at 51, e.g. in vibration absorbing mountings. On the machine frame, a sensor 13 is mounted to respond to the vibrations, oscillations or accelerations of the machine frame resulting from rotation of the shaft 11 and the drum 12, both with and without the filling with a suspension. The sensor 13, preferably an accelerometer, is connected to the signal input of a device 20 for frequency analysis, namely, a frequency analyzer operating with fast fourier transforms (FFT). The signal output of the frequency analyzer 20 is connected to the signal input of the evaluating circuitry or computer 21 which has an output connected to a display device. The display device 22 can be a printer, a pen recorder, an oscillograph, a plotter or some other device capable of displaying the result of spectral analysis, namely, a plot of frequency versus amplitude over a measured frequency range.

Figure 2:
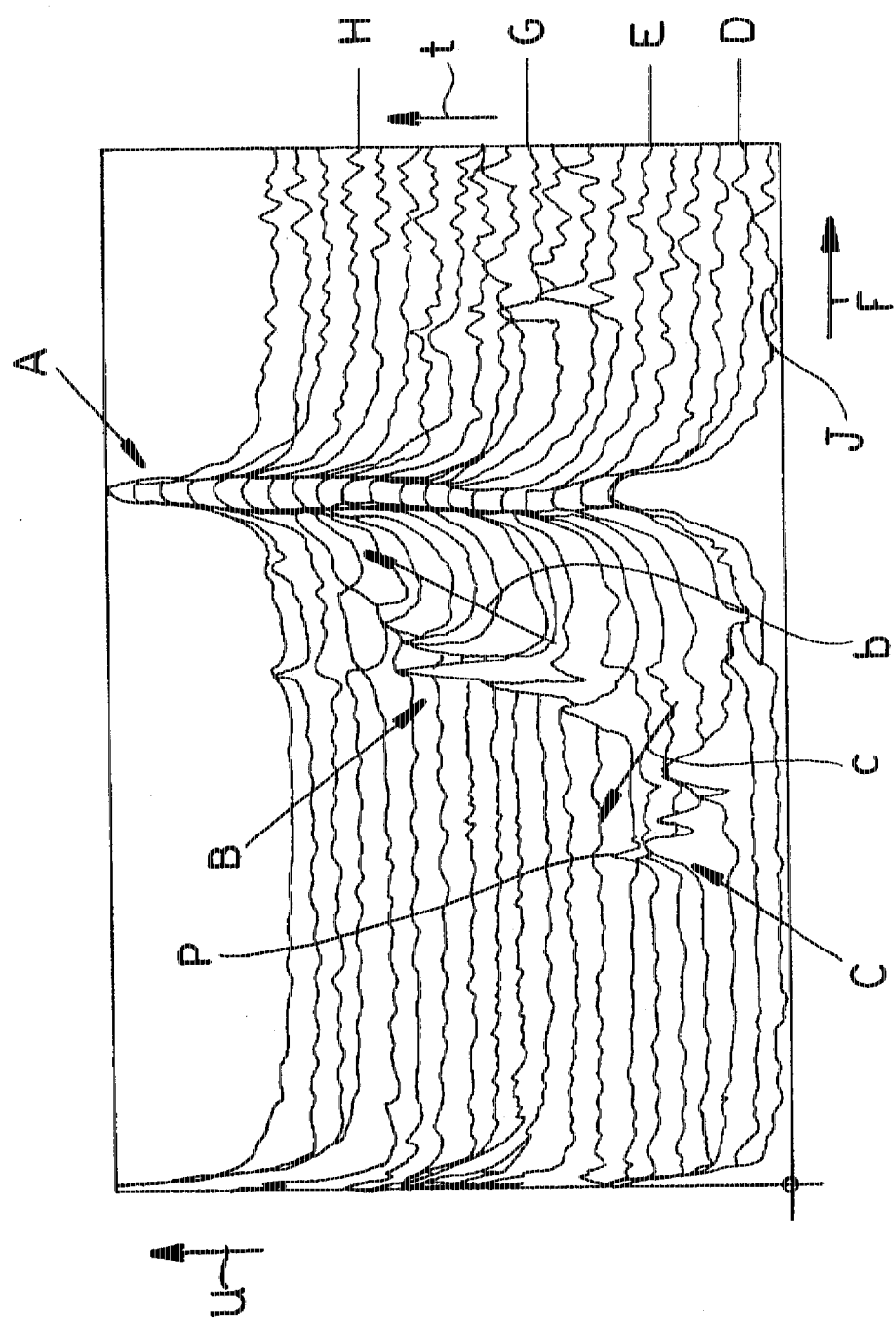
FIG. 2 is a plot of a multiplicity of successively derived vibration frequency spectra in accordance with the process of the invention in a first embodiment.

FIG. 2 shows a multiplicity of vibration frequency spectra of a centrifuge obtained successively over a period of time, the vibration frequency being plotted along the abscissa versus intensity or amplitude along the ordinate. The successive curves are obtained one after another in time-spaced relationship from the bottom to the top. From a starting point, time t increases upwardly in the series of plots shown in FIG. 2.

The vibration frequency and vibration amplitude of the centrifuge are obtained as electrical signals which are subjected to frequency analysis as they are obtained from the pick up 13. From the respective frequency spectrum, individual harmonic isolations are oscillations for example, after a Fourier analysis. Then the characteristic intensities or amplitudes of the harmonic isolations are determined for each measuring interval. In FIG. 2 the intensities or amplitudes U are plotted versus the frequency F when the plots are repeated at a plurality of successive time intervals and the respective curves are arranged one above another and hence spatially one above another over a time t, the result being FIG. 2. The region A is the harmonic oscillation resulting from the rotary frequency of the filter drum. The intensity maxima indicated at B, of comparatively low frequency represent the effect of liquid over the filter cake. The amplitude maxima of still lower frequency L at C have their origins in the presence of the suspension during the filling process.

With t increasing upwardly in the plot, at the point in time O, filling of the centrifuge is begun, the filling process terminating at a point in time E. The frequency spectrum J below the commencement of filling at D, represents the characteristic oscillations or vibration of the centrifuge in the absence of the suspension and the components thereof.

At the point in time G, the siphon is brought into play to commence discharge of the liquid phase, resulting in a progressive decrease in the liquid phase in the drum and ultimate centrifugal extraction of the filter cake. At the point in time H, the filtration process has terminated as the last of the liquid phase has passed through the filter cake. It will be clear from FIG. 2 that in the region C between the beginning and end of the filling process there is a frequency reduction from peak to peak characteristic of the filling operation along the arrow C. At the end of the filling process, i.e. the peak in the region C of the frequency spectrum P corresponding to the point E, the liquid is accelerated with a jump which eliminates the peaks of the region C and gives rise to the peaks at the higher frequency region B. As the arrow b indicates, the successive peaks correspond to the region B of the progressive higher frequency during the filtration process until the end of filtration corresponding to the point in time H. The reduction in the liquid component in the drum results in a decrease in the intensity or amplitude in the region B toward the end of filtration. At the end of filtration the peaks at region B disappear.

From the measurement of the successive peaks in the region C, the computer 21 can signal the end of the filling process while the detection of the sequence of peaks in the region B signal the progress of the filtration process via the computer 21 and the detection of the disappearance of the region B, the point in time for ending of the filtration process.

The evaluation circuitry can thus provide a window for the selected frequency portions of the curves of FIG. 2, preferably in the region below the rotary frequency of the filter drum, i.e. below the region A. Within the windows corresponding to the region C and B, the intensities and frequencies of the respective peaks can be determined and the position and intensity changes observed. Upon reaching a predetermined intensity and/or a predetermined frequency for a peak of the respective window, the centrifuge can be controlled or regulated as to further operations or with respect to changes in speed. For example, upon the ending of the filling, the centrifuge can be accelerated or at the ending of the filtration stage the centrifuge can be brought to a standstill.

Figure 3:
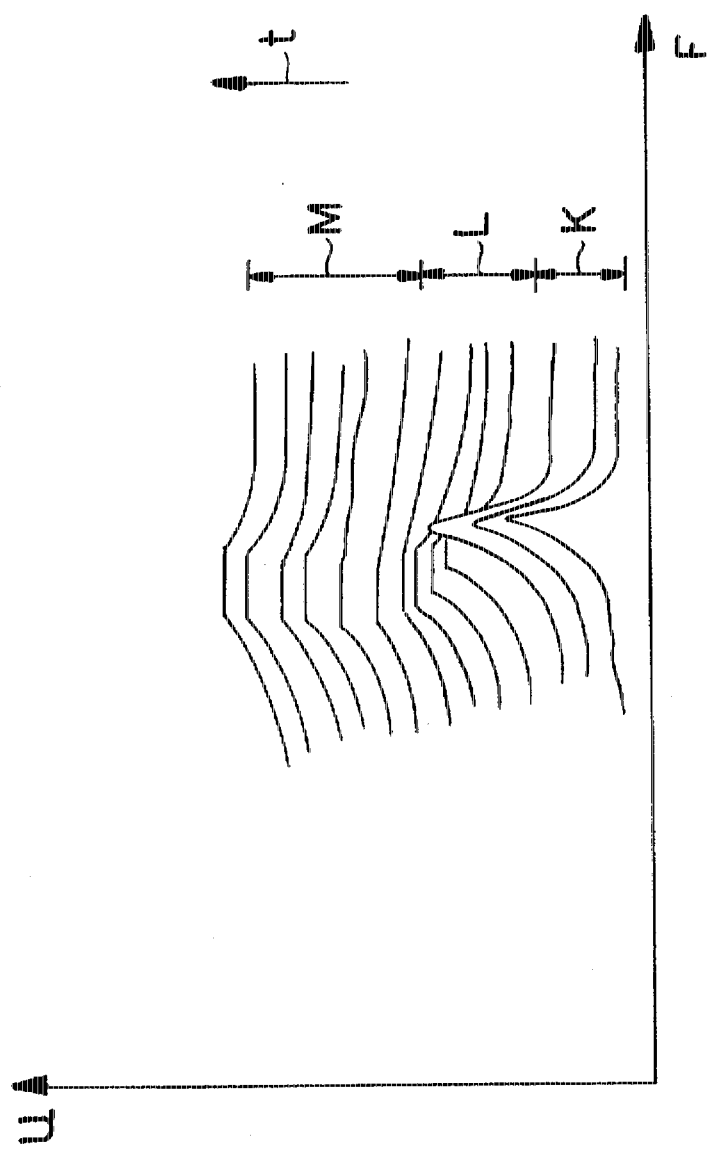
FIG. 3 is an illustration of vibration frequency spectra in a second embodiment of the process.

FIG. 3 represents the characteristic curves for the rotor characteristic frequency in plots of the frequency versus amplitude or intensity. As in FIG. 2, the curves of FIG. 3 correspond to successive plots of the frequency spectrum of the region of the rotor characteristic frequency. The curve shows a characteristic sequence of small peaks (region K), characterizing the empty centrifuge, which at the beginning of filling are lower and wider (region L). The flattening effect is associated with an increased damping. The increased damping is generated by the liquid which is fed to the centrifuge drum. With increasing centrifugation, the liquid is discharged from the centrifuge and the filter cake deposits on the drum. The filter cake increases the damping effect (region M). The peak curve of the rotor characteristic frequency shifts in the direction of lower frequencies since, at the beginning of the filling, the rotating mass is increased. Once the liquid is largely centrifugally separated, the characteristic frequency increases again but nevertheless remains below the starting frequency prior to the filling of the centrifuge as a consequence of the filter cake remaining therein. Thus; the parameters of the filter operation can be ascertained by analysis of the peaks and their locations along the successive frequency spectra in this case as well.

We claim:

1. A method of determining an operating parameter of a centrifuge selected from a degree of solids filling and a degree of liquid filling, comprising the steps of:
   (a) supplying a centrifuge with a suspension of solids in a liquid, and driving said centrifuge to discharge liquid of said suspension and collect said solids;
   (b) detecting vibration of said centrifuge resulting from rotation of a centrifuge rotor and producing electrical signals of a frequency and amplitude representing said vibration and having a frequency spectrum characteristic of operation of said centrifuge, presence and absence of said suspension, and characteristics of said liquid and solids in said centrifuge;
   (c) subjecting said electrical signals to a frequency spectrum analysis and isolating from said frequency spectrum by said analysis a certain selected frequency; and
   (d) determining said parameter selected from a degree of solids filling and a degree of liquid filling by evaluating a change in amplitude of said certain selected frequencies over a time interval.

2. The method defined in claim 1 wherein the frequency spectrum analysis is a fast Fourier transform analysis.

3. The method as defined in claim 2 wherein an amplitude of said certain frequency is compared with an amplitude of a predetermined frequency.

4. The method defined in claim 2 wherein steps (b) and (c) are repeated and a change in amplitude of said certain selected frequency is detected for determining said parameter.

* * * * *